United States Patent
Nakamura

[11] 3,858,439
[51] Jan. 7, 1975

[54] METHOD AND APPARATUS FOR ACOUSTIC EMISSION NON-DESTRUCTIVE TESTING

[75] Inventor: Yosio Nakamura, Seabrook, Tex.

[73] Assignee: General Dynamics Corporation, Fort Worth, Tex.

[22] Filed: Sept. 26, 1973

[21] Appl. No.: 400,766

Related U.S. Application Data
[63] Continuation-in-part of Ser. No. 118,855, Feb. 25, 1971, abandoned.

[52] U.S. Cl. .................................................. 73/71.4
[51] Int. Cl. ............................................. G01h 1/00
[58] Field of Search .............. 73/67, 69, 67.9, 71.4, 73/88 R, 88.5 R, 557, 558; 340/261

[56] References Cited
UNITED STATES PATENTS

| | | | |
|---|---|---|---|
| 3,505,597 | 4/1970 | Cronin et al. | 73/71.4 X |
| 3,713,127 | 1/1973 | Keledy et al. | 73/67 |
| 3,822,586 | 7/1974 | Pollock | 73/71.4 |

Primary Examiner—Charles A. Ruehl
Attorney, Agent, or Firm—John R. Duncan

[57] ABSTRACT

A method and apparatus for the detection of incipient structural failures by acoustic emission monitoring in the presence of background noise. One or more "master" sensors are placed on the structure to be tested and are surrounded by a plurality of "slave" sensors. Each sensor detects acoustic emissions in the structure and sends a corresponding signal to an Acoustic Emission Monitor (AEM). The AEM includes electronic circuitry which accepts only signals which reach the master sensors before they reach the slave sensors, thus excluding signals originating outside the area covered by the sensor array. The AEM also contains frequency filters excluding signals outside the desired frequency range, to exclude most background "noise." These techniques permit the detection of acoustic emissions from flaws and propagating cracks in structures of complex shape in an acoustically noisy environment.

11 Claims, 11 Drawing Figures

METHOD AND APPARATUS FOR ACOUSTIC EMISSION NON-DESTRUCTIVE TESTING

CROSS REFERENCE TO RELATED APPLICATION

This application is a continuation-in-part of copending U.S. patent application Ser. No. 118,855, filed Feb. 25, 1971, now abandoned.

BACKGROUND OF THE INVENTION

This invention relates in general to acoustic emission monitoring and, more specifically, to the detection of structural flaws by acoustic emission techniques in large complex structures in an acoustically noisy environment.

When a solid material is stressed, it deforms under the applied stress. If the deformation is within the elastic limit of the material, the work done by an applied force for example is stored in the material as elastic strain energy.

When the local stress in such a body exceeds the strength of the material at that point the material breaks or a crack is formed. The formation of a crack or growth of an existing crack relieves the local strain, releasing part of the strain energy stored at that region. A portion of the released energy is spent by the increased crack surface as surface energy, while another portion of the released energy is transmitted from the region as acoustic waves. This emission of energy in the form of acoustic waves is called acoustic emission.

Sensors at the metal surface can detect acoustic waves in the material and, with proper amplification, signal discrimination and triangulation, the location of the deformation or fracture can be determined. Recently, a number of workers have attempted to develop practical uses for this phenomenon, especially in the field of non-destructive testing of metal structures to detect the nucleation or propagation of cracks or other internal flaws.

Interference from background noise has generally limited this technique to such nearly noise-free cases as the inspection of welded joints, pressure vessels, etc. While frequency filtering used alone may be able to exclude much background noise, noise in the frequency range to be analyzed coming from outside the area being inspected often prevents accurate defect detection. Where a large, complex, multi-part structure is to be inspected while undergoing a structural test, interfering acoustic background noise is encountered due to vibration of the loading apparatus caused by the hydraulic system used to load the structure, mechanical noise produced by relative movement of the various joints and connections in the loading apparatus, including the interfaces between the test apparatus and the structure being tested, and mechanical noise generated by relative movement in joints within the structure being tested. Prior techniques are incapable of excluding this background noise, much of which originates outside the test structure.

Thus, there is a continuing need for improved acoustic emission methods and apparatus to permit inspection of complex shapes under load.

It is, therefore, an object of this invention to provide an improved non-destructive testing method using acoustic emissions.

Another object of this invention is to provide an acoustic emission monitoring system suitable for use with large complex structures.

A further object of this invention is to provide a method and apparatus for excluding background noise during acoustic emission monitoring.

The above objects, and others, are accomplished in accordance with this invention by a method and apparatus in which a spatial filter using an array of sensors and logic circuits excludes all background noise signals originating outside the area being inspected. The sensor array comprises one or more "master" sensors in a region surrounded by a plurality of "slave" sensors. As is detailed below, the sensors are connected to an acoustic emission monitor (AEM) which includes a gating system. When a noise signal, originating outside the region arrives at this array, one of the slave sensors intercepts the signal and closes the gate, which is normally open. The gate is kept closed as long as there is a detectable noise signal on any of the sensors. Thus, when the master sensors sense this noise signal, there will be no output. For an acoustic emission signal originating within the region being monitored, the gate is open when a master sensor receives the signal. Consequently, an output is obtained, indicating that there is an acoustic emission source within the region.

Preferably, frequency filters are used to eliminate signals having frequencies above and below the frequency range being investigated. This prevents the gates being locked off by a continuous outside noise, since nearly all continuous noises are of relatively low frequency and can be eliminated very easily by a high-pass filter.

This system has been found to be very effective in eliminating noise coming from outside the test region, most of which originates in the fixture holding and loading the test structure. The rejection of more than 30,000 noise signals to detect one actual acoustic emission signal is not uncommon in an ordinary setup for a fatigue test.

BRIEF DESCRIPTION OF THE DRAWING

Details of the invention, and of a preferred embodiment thereof, will be further understood upon reference to the frawing, wherein.

DETAILED DESCRIPTION OF THE INVENTION

Figure 1:
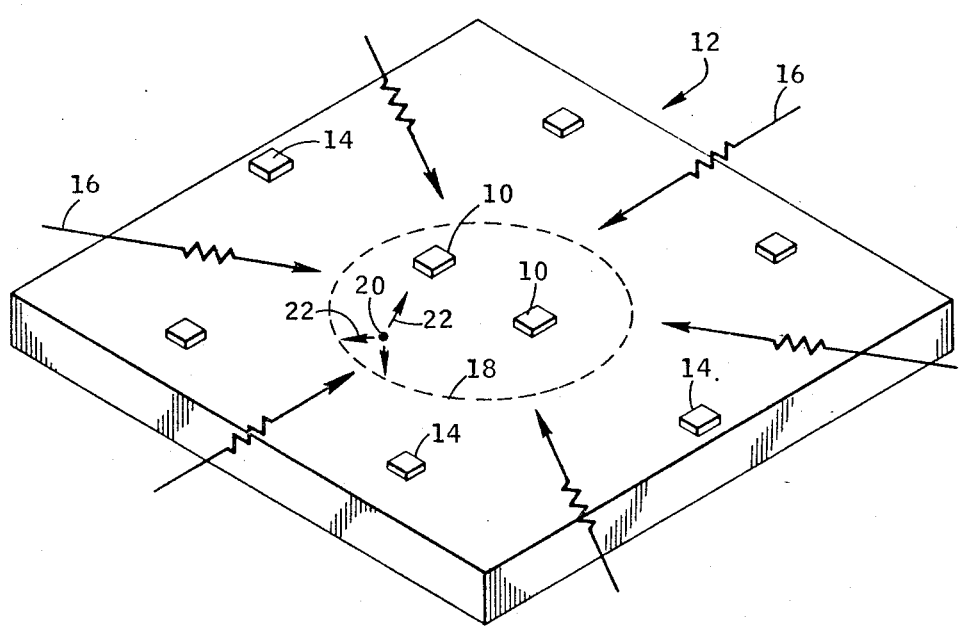
FIG. 1 is a simplified schematic representation of an array of sensors on a structure to be tested.

FIG. 1 shows a typical array of sensors arranged to provide acoustic signals in accordance with this invention. One or more "master" sensors 10 on a structure surface 12 are surrounded by a plurality of "slave" sensors 14. An acoustic wave symbolized by arrows 16 arriving from a source outside the sensor array will reach at least one slave sensor 14 before reaching a master sensor 10. As is described in detail below, an electronic gating circuit is provided so that master sensors 10 will "ignore" such outside signals. However, an acoustic event, such as the formation or growth of a crack, may happen at a location such as at 20 within region 18 (basically, nearer to a master sensor than to a slave sensor). When acoustic waves travel in all directions away from point 20, as symbolized by arrows 22, they will reach a master sensor 10 before reaching a slave sensor 14 and an output signal will be generated. Thus, it is possible to detect acoustic emissions occurring within area 18 despite considerable acoustic noise from emissions occurring outside that area.

The location of the signal source within area 18 can be determined through triangulation by comparing signal arrival times at different sensors.

Any suitable sensors may be used for sensors 10 and 14 to sense and transduce acoustic waves into electrical signals. Typical sensors include lead-zirconate-titanate transducers such as the Glennite HST-41 available from Gulton Industries.

The sensors may be secured to the structure in any suitable manner at any suitable locations. Generally, the master sensors 10 are located within or near the area 20 where crack initiation is suspected or has been indicated by other evidence. Then slave sensors 14 are arranged to encircle the area so that a noise originating at any possible source outside the area arrives at a slave sensor before it reaches any of the master sensors 10. The number of slave sensors 14 required for an array depends upon the complexity of the structure. Preferably, from two to six slave sensors 14 are used with two master sensors 10 to provide most effective coverage.

The distance between a slave sensor 14 and the closest master sensor 10 in an array is determined by the location of noise sources, test structure material and configuration of the test structure. Preferably, a time separation of at least about 10 microseconds is provided between master and slave signals for most effective monitoring. For a typical steel structure with a compressional wave velocity of 6mm/$\mu$s, this time separation corresponds to about 60mm, or 2.4 inch, difference in distance. In practice, however, smaller separations have been used successfully.

Once the sensors are installed, they are connected to the monitoring equipment by conventional connecting cables, which are preferably no longer than about 6 feet to minimize signal attenuation.

Figure 2:
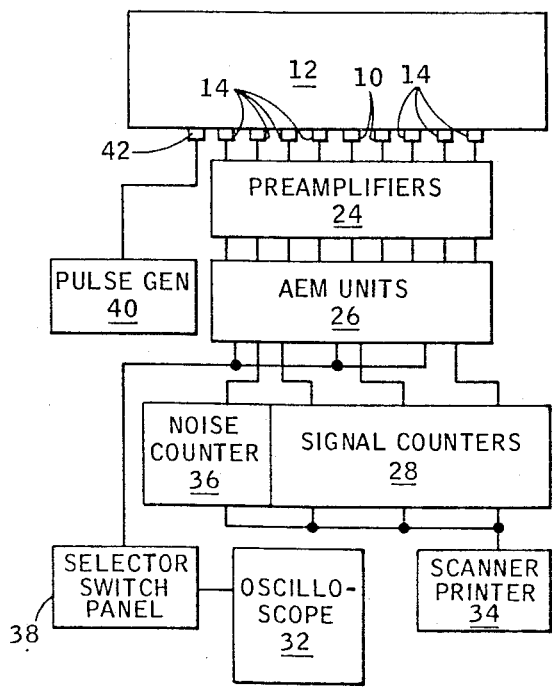
FIG. 2 is a schematic block diagram of the system components.

Referring now to FIG. 2, there is seen a schematic block diagram of the monitoring system components.

Master sensors 10 and slave sensors 14 are connected through a set of preamplifiers 24 to the AEM unit 26. The preamplifier set 24 includes one preamplifier for each sensor, to increase the sensor signal to a useable level. Any suitable preamplifier may be used, such as the Model S-30, available from Arvee Engineering Co.

The preamplified signals are then distributed to the AEM units 26.

Within AEM units 26 the signals are processed through a series of logic circuits, as described below. A number of different outputs are available from AEM units 26. A count output, which indicates the existence of an acoustic signal source within area 18 being covered by the sensor array, may be transmitted to a signal counter 28. The count output is typically a positive pulse starting 1 microsecond after a moment when one of the master sensors receives a signal that satisfies a condition that no slave sensor receives a signal within 150 microseconds prior to or 1 microsecond following that moment. Any suitable counter may be used, such as a group of Model 1492 or 1476 scalers, available from Canberra Industries. The counter output may be recorded in any suitable manner, such as by scanner printer 34. Suitable printers include the Canberra serial scanner/printer Model 1489. An identical output, called the count synchronization output may be used to trigger oscilloscope 32 for a continuous monitoring of signal waveforms. Any suitable oscilloscope may be used. A typical oscilloscope is the Tektronix 555 dual-beam oscilloscope for monitoring parallel signals for comparison of waveforms.

If it is desired to observe noise waveforms, a further output may be provided, as detailed below, called the comparator synchronization output which provides a positive pulse starting at a moment when any one of the inputs receives a signal after a quiet interval of at least 150 microseconds, indicating that a signal comparison by the logic circuits has begun within the unit. This output may be counted on a noise signal counter 36 (similar to signal counters 28) indicating the noise level, or may be used to trigger an oscilloscope for a visual observation of noise waveforms.

Additional outputs may be provided as desired, so that signals at different points within the system may be observed. For example, an oscilloscope may be connected through a selector switch 38 to examine the waveform of any master or slave input signal, etc.

A performance check of the system may be made by applying a short pulse from a conventional pulse generator 40 such as a Model 101, available from Datapulse, Inc., to a source transducer 42 located on the test surface. A typical source generator is a small piece of Glennite HDT-31 lead-zirconate-titanate piezoelectric transducer made by Gulton Industries. The test pulse thus applied simulates a small growing crack in the test structure.

This over-all system, then, is capable of detecting, locating and evaluating acoustic emissions originating within a selected region. Details of the novel acoustic emission monitor 26 which is especially useful in this system are provided in conjunction with the explanation of FIGS. 3-9 below.

Figure 3:
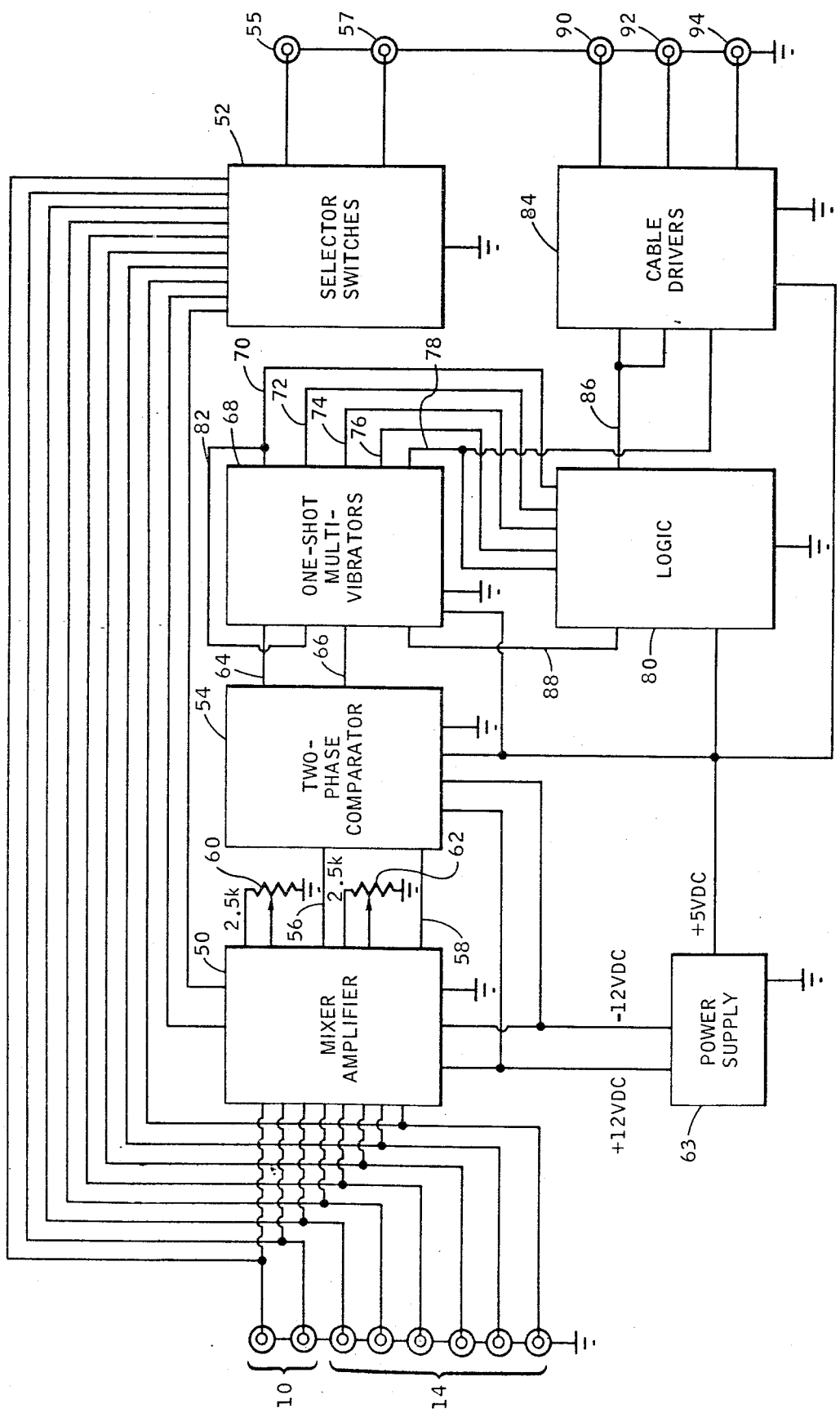
FIG. 3 is a schematic circuit diagram of the acoustic emission monitor (AEM)

Referring now to FIG. 3, there is seen a block diagram of AEM 26, illustrating a preferred embodiment thereof. FIGS. 4-8 provide detailed circuit diagrams illustrating preferred subcombinations useful in the AEM shown in FIG. 3.

In the embodiment shown in FIG. 3, there are provided signal inputs from two master sensors 10 and from six slave sensors 14, each of which signals have been preamplified in preamplifier set 24.

Each sensor input is connected to mixer-amplifier 50 and to a pair of selector switches 52 which are arranged to connect any sensor input to either of two test points 55 and 57. The mixer-amplifier circuit is detailed in FIG. 4.

Selector switches 52 are a pair of conventional single pole, 11-position switches such as the Series pS100 switch available from Centralab, Inc. All sensor input lines are connected to both switches. The switches are wired so that any individual input signal, the combined master input signal or the combined slave input signal may be selected and applied to either of the two test points 55 and 57. The test points may be connected to an oscilloscope for observation of the input signal waveforms.

Mixer-amplifier 50 combines and amplifies the signals from the master sensor 10 and feeds them to two-phase comparator 54 through line 56 and combines and amplifies the signals from the slave sensors 14 and feeds them to comparator 54 through line 58. A pair of adjustable potentiometers 60 and 62 are provided for adjustment of threshold sensitivity of the AEM, as is further described below. The combined signals are filtered by 100kHZ high-pass filters in mixer-amplifier 50 to eliminate low-frequency noise.

System power is supplied by a ±12Vdc and +5Vdc power supply 63.

Figure 5:
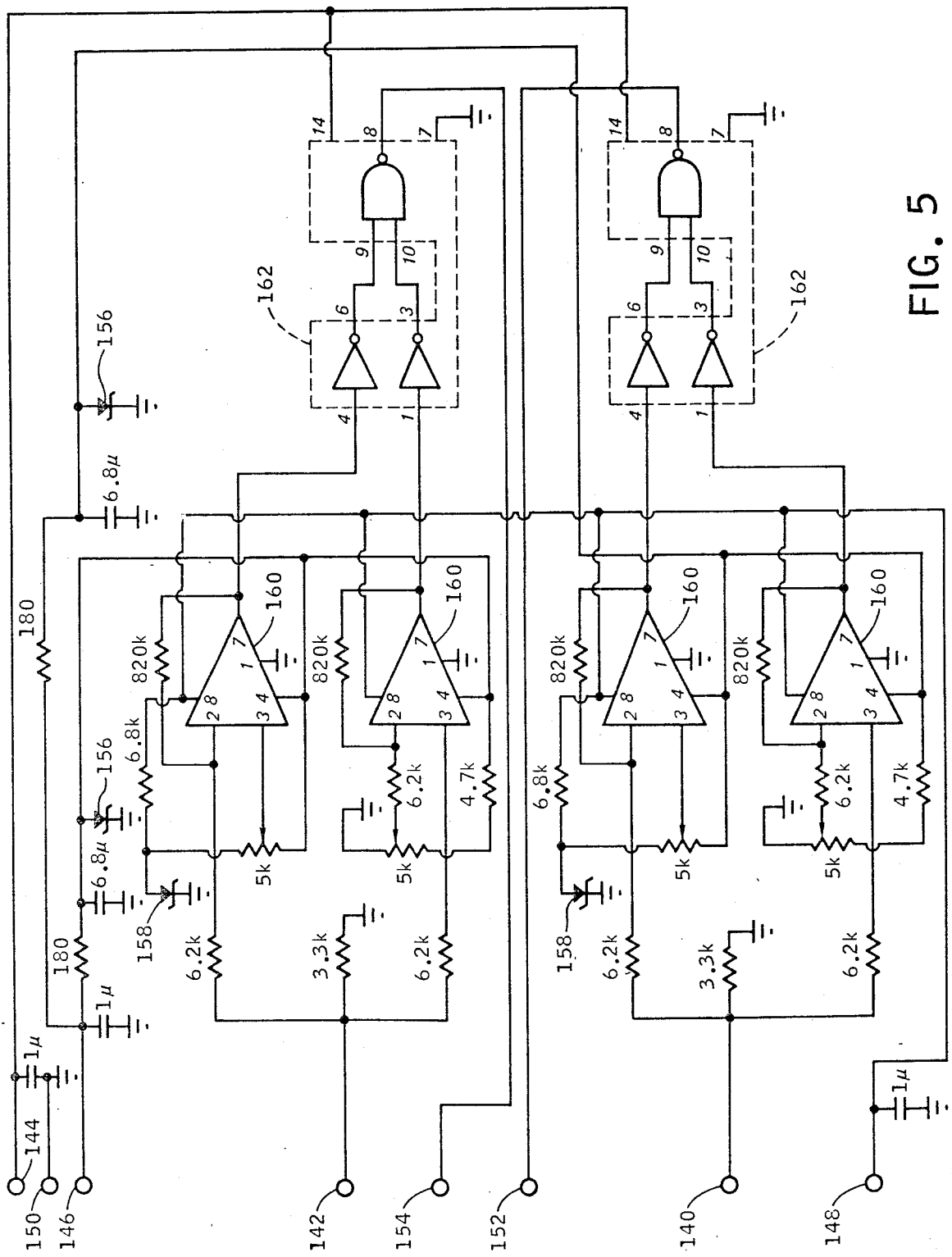
FIG. 5 is a circuit diagram of an AEM two-phase comparator circuit.

The combined master and slave signals are received by two-phase comparator 54, the circuit of which is detailed in FIG. 5. Comparator 54 acts as a discriminator and converts the analog signals to two-state digital signals.

The output signals from comparator 54 pass through wires 64 (master signal) and 66 (slave signal) to a one-shot multivibrator group 68. The circuit of multivibrator group 68 is described in detail in FIG. 6. Here, gate signals are generated and gate length determined. As discussed below, these gates are used to eliminate noise signals from the system. The master gate signal, a master delay signal, slave gate signal, comparator gate signal, and a comparator pulse signal are passed to logic system 80 through wires 70, 72, 74, 76 and 78, respectively. The master gate signal is also fed back to the gate delay circuitry of multivibrator system 68 through wire 82.

Figure 7:
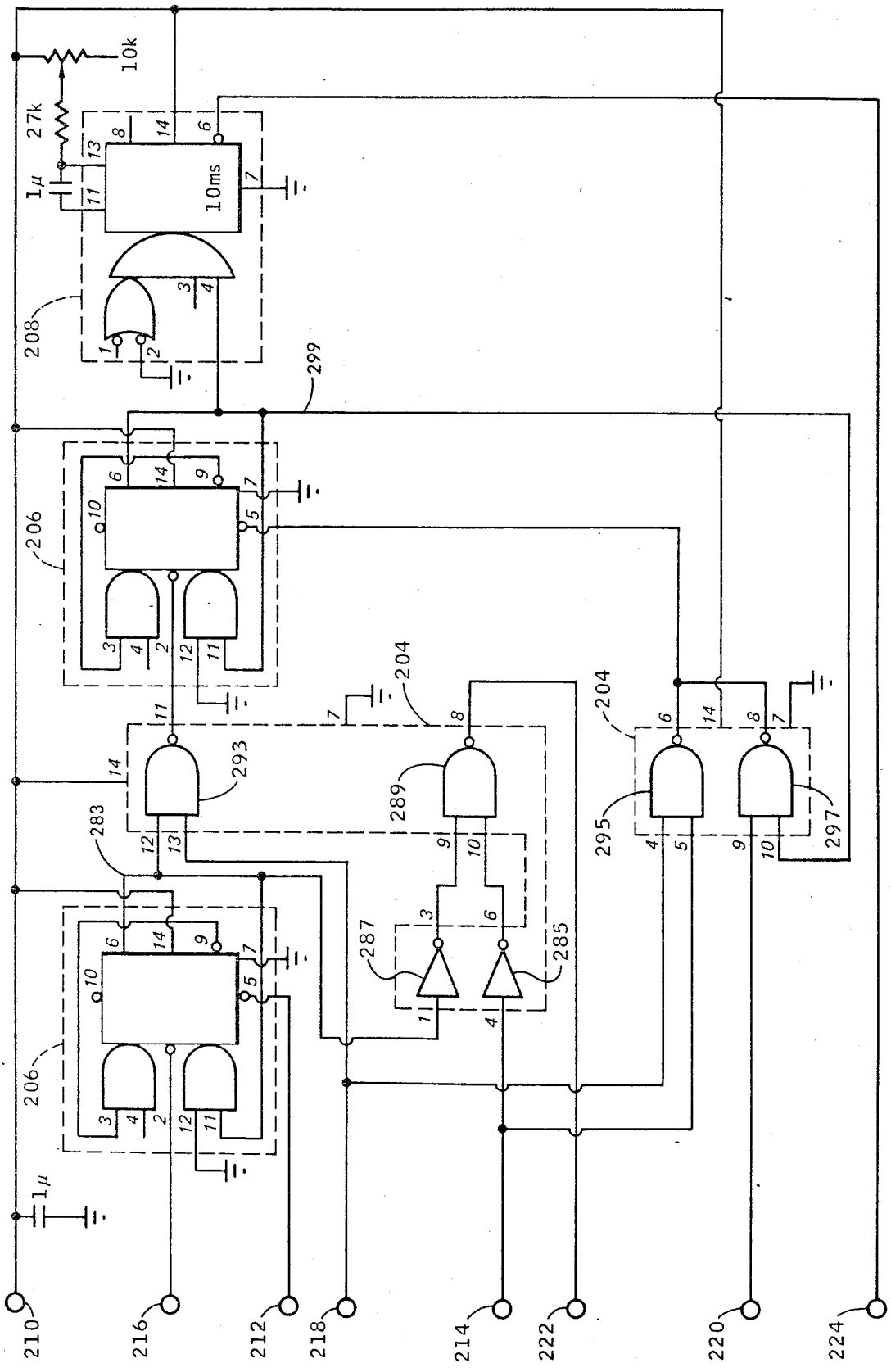
FIG. 7 is a diagram of an AEM logic circuit.

The circuit of logic system 80 is shown in detail in FIG. 7. Here, the master and slave signals are compared and all signals which reached slave sensors before reaching master sensors are eliminated. The output of logic system 80, which consists only of acoustic emission count signals from sources within the test region, are passed to a cable driver system 84 through wire 86. A comparator gate signal is fed back to multivibrator 68 through wire 88.

Cable drivers 84 serve to transform impedances of output lines 86 and 78 to match the impedances of the transmission cables that will carry output signals to appropriate output devices. A detailed circuit diagram of the cable driver 84 is provided in FIG. 8. As described above, the ultimate output of the AEM includes count output at terminal 90 indicating presence of an acoustic signal source in the test area which may be used to advance a signal counter; a count synchronization output at terminal 92 which is the same as the count output and can be used to trigger oscilloscope traces and a comparator synchronization output which provides a positive pulse starting at a moment when any of the inputs receives a signal after a 150 microsecond quiet interval and which may be counted in a counter to establish the noise level.

Details of the circuitry within the AEM illustrated in FIG. 3 are shown in FIGS. 4 through 8.

Figure 4:
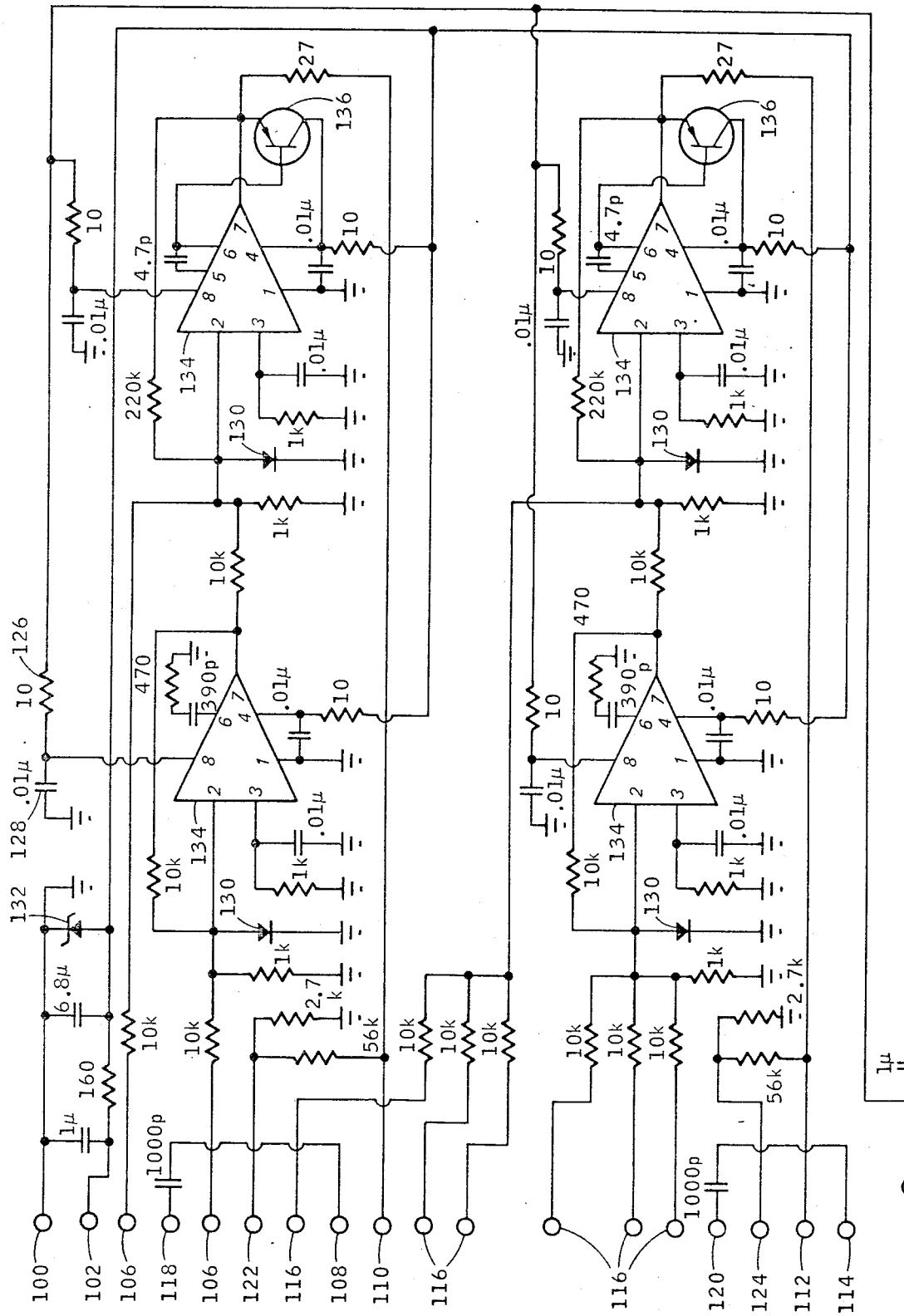
FIG. 4 is a diagram of an AEM mixer-amplifier circuit.

FIG. 4 shows the circuit diagram for a preferred embodiment of a mixer-amplifier 50 useful in the AEM. The connections on mixer-amplifier 50 include a common ground 100, a −12Vdc input 102 and +12Vdc input 104. The two master sensor signals enter terminals 106. The connections to potentiometers 60 and 62 are made between terminals 108 and 110 and between terminals 112 and 114, respectively. The slave signals enter terminals 116. The combined master signal output wire 56 is connected at 118 and the combined slave output wire 58 is connected at 120. Selector switch 52 is connected to terminals 122 and 124 to pass combined master and combined slave signals to test points 55 and 57.

For clarity the symbols for ohms and farads are omitted from the values shown for resistors and capacitors. For example, resistor 126 should be read as 10 Ohms and capacitor 128 as 0.01 microfarad. Other resistors and capacitors are not given reference numbers, since their values are apparent.

As seen in FIG. 4, elements 130 are 1N916 diodes, available from Fairchild Semiconductors; element 132 is a 1N4735A zenor diode, available from Motorola Semiconductor Products; elements 134 are µA702 operational amplifiers, available from Fairchild Semiconductors; and elements 136 are 2N3906 transistors, available from Motorola Semiconductor Products. Throughout the drawings, the small italic numbers within elements such as 134 in FIG. 4 and adjacent elements such as 162 in FIG. 5 refer to conventional integrated circuit pin numbering and are simply included for clarity.

The combined master signal and combined slave signal from mixer-amplifier 50 pass through wires 56 and 58 to terminals 140 and 142, respectively, as seen in FIG. 5, which presents a circuit diagram for a preferred two-phase comparator 54. Comparator 54 is powered by +5Vdc supplied to terminal 144, −12Vdc supplied to terminal 146, and +12Vdc supplied to terminal 148. Terminal 150 is a common ground. The detected master output signal from terminal 152 and detected slave output signal from terminal 154 pass through wires 64 and 66 respectively to multivibrator system 68. As seen in FIG. 5, major components include elements 156, each a 1N4735A zenor diode; elements 158, each a 1N916 diode, available from Fairchild Semiconductors; element 160, each a µA710 operational amplifier, available from Fairchild Semiconductors, and elements 162, each a MC846P quad NAND gate, available from Motorola.

Figure 6:
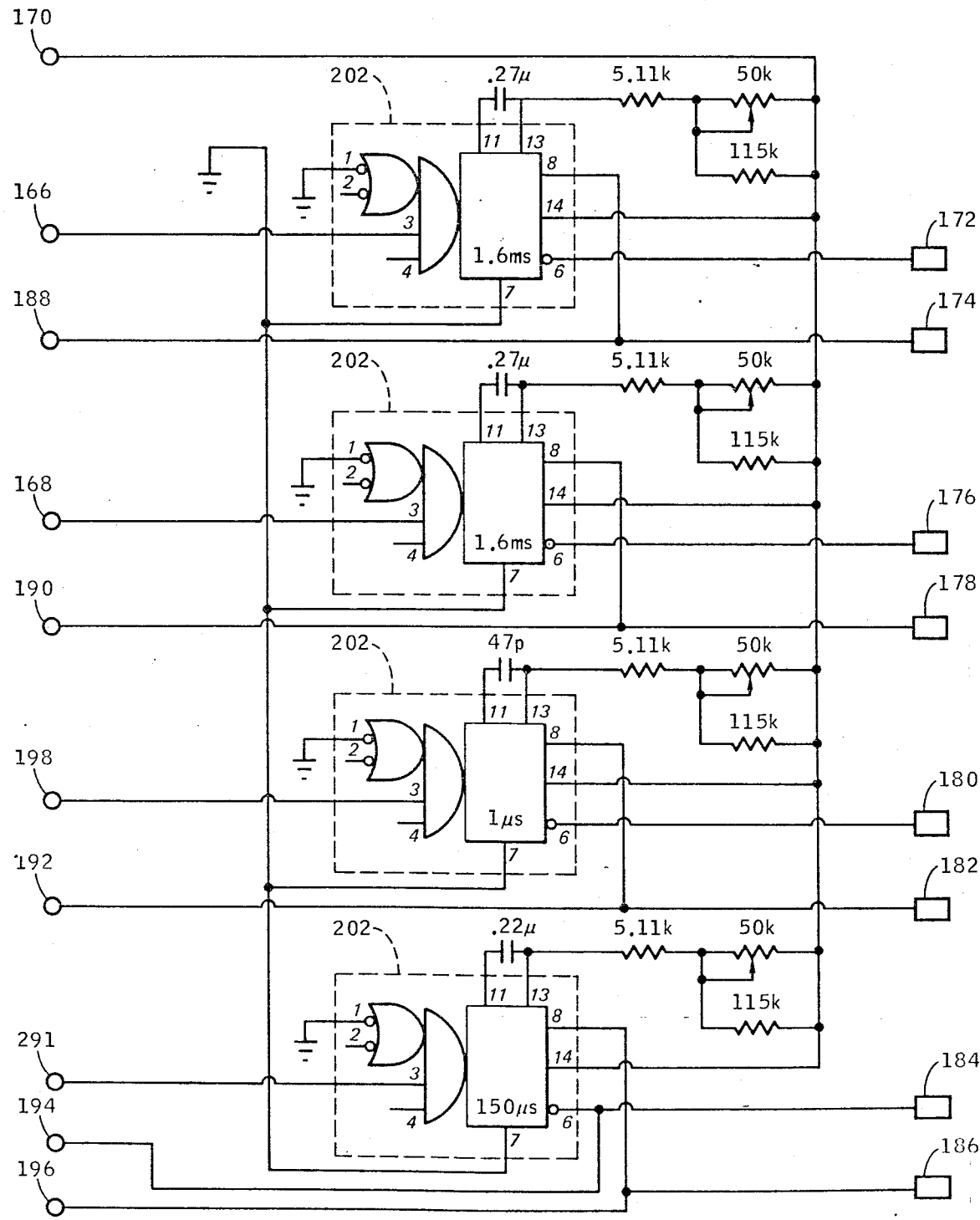
FIG. 6 is a diagram of an AEM monostable multivibrator circuit.

The multivibrator group 68 as illustrated in FIG. 6, which includes four independent multivibrators, receives detected master and slave signals through wires 64 and 66 at terminals 166 and 168, respectively, master gate signal through wire 82 at terminal 198, and comparator gate signal through wire 88 at terminal 291. Multivibrator group 68 is powered by a +5Vdc supply connected to terminal 170. In order that the system may be tested, a number of test connections are provided so that signals at various points in the circuit may be analyzed. Of these, testing is provided at 172 of complement of master gate signal, 174 of the master gate signal, 176 of complement of slave gate signal, 178 of the slave gate signal, 180 of complement of master delay signal, 182 of the master delay signal, 184 of comparator pulse signal, and 186 of the comparator gate signal.

Output signals from multivibrator group 68 include the master gate signal at terminal 188, the slave gate signal at terminal 190, the master delay signal at terminal 192, the comparator pulse signal at terminal 194, and the comparator gate signal at terminal 196.

As shown, the multivibrator group includes a number of capacitors and resistors, having the indicated values in farads and ohms, and four TTµL 9601 monostable multivibrators 202, available from Fairchild Semiconductor.

The output signals from the multivibrator group 68 pass to the logic system 80 as shown in FIG. 3. A detailed circuit diagram of logic system 80 is shown in FIG. 7.

Logic system 80, basically comprises two MC846P quad NAND gates 204, available from Motorola, two MC848P RTS flip flop 206, available from Motorola, and one TT$\mu$L 9601 monostable multivibrator 208, available from Fairchild Semiconductor, each connected as shown. Circuit power, +5Vdc, is supplied at terminal 210. Inputs to logic system 80 include the master gate signal at terminal 212, the slave gate signal at terminal 214, the master delay signal at terminal 216, the comparator gate signal at terminal 218, and the comparator pulse signal terminal 220. Outputs from the logic circuit include the comparator gate signal from terminal 222 back to the multivibrator group 68 and the count output from terminal 224 to the cable driver system, as seen in FIG. 3.

Figure 8:
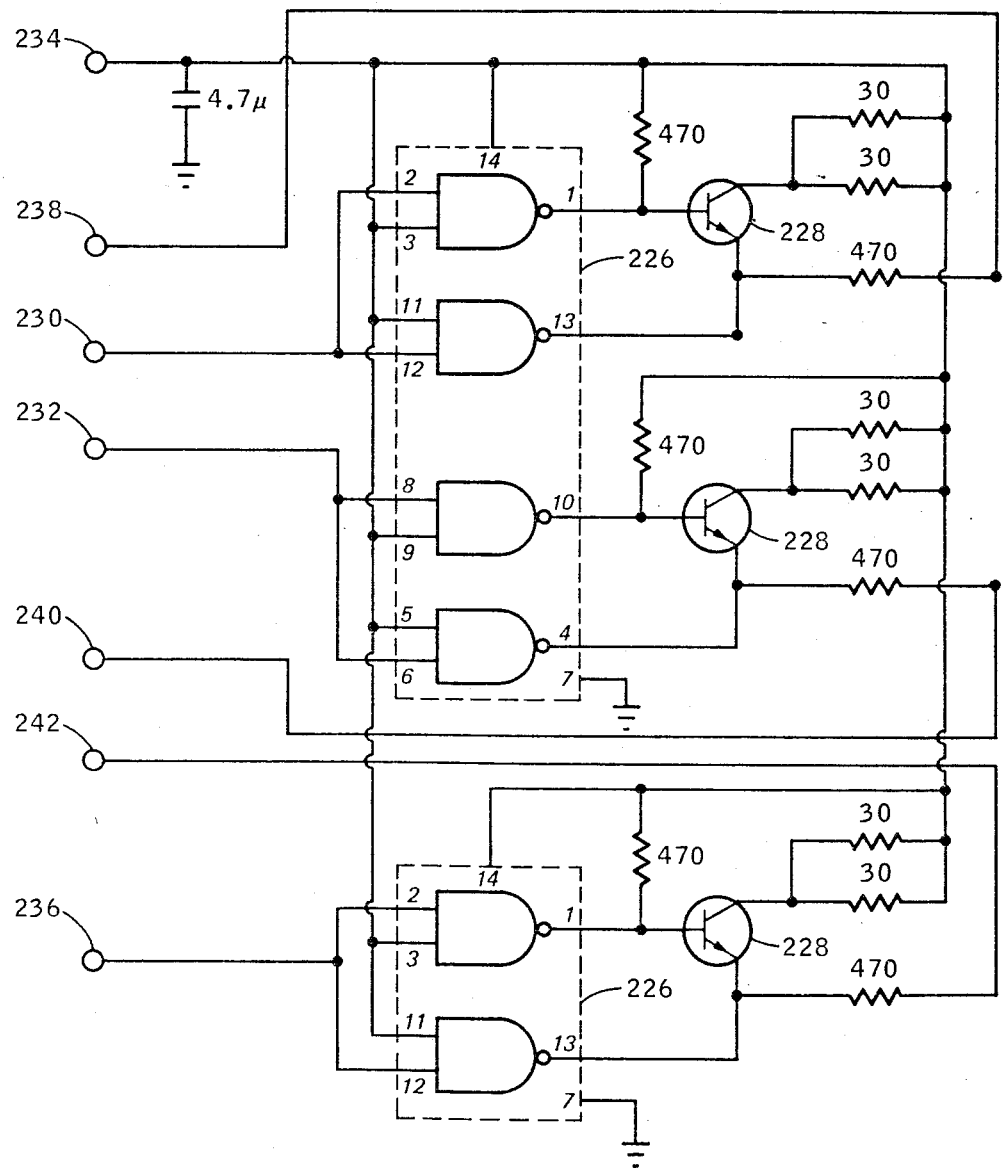
FIG. 8 is a diagram of an AEM cable driver circuit.

The cable driver system 84, which receives the count output from the logic circuit, is detailed in FIG. 8. In addition to the resistors and capacitors shown, which have the indicated values in ohms and farads, respectively, the cable driver system 84 consists primarily of two SN7401N quad NAND gates 226, available from Fairchild Semiconductors, and three MPS2369 transistors 228, available from Motorola Semiconductor Products.

Cable driver circuit 84 receives the count signal from logic circuit 80 at terminals 230 and 232, power from +5Vdc power supply at terminal 234 and a comparator signal from multivibrator system 68 at terminal 236. The output of cable driver 84 includes count output signal at terminal 238, count synchronization signal at terminal 240 and comparator synchronization signal at terminal 240. These three terminals are wired to terminals 90, 92 and 94, as seen in FIG. 3, permitting connection to an appropriate counter or oscilloscope, as discussed above.

Figure 9A:
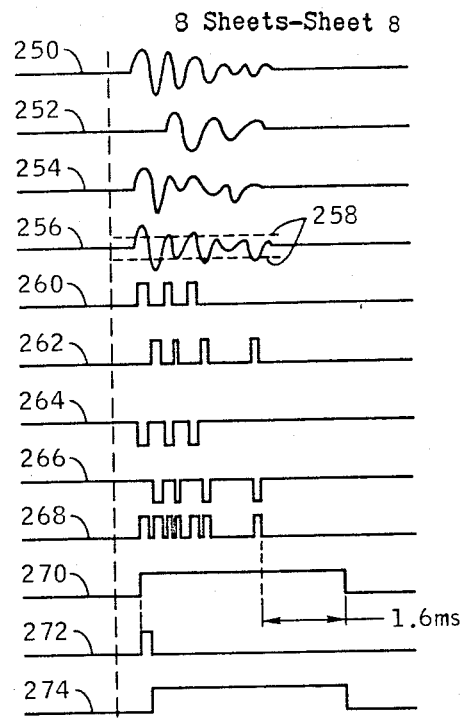
FIGS. 9(a), 9(b), and 9(c) are a comparative illustration of signal waveforms at various points in the system.
Figure 9B:
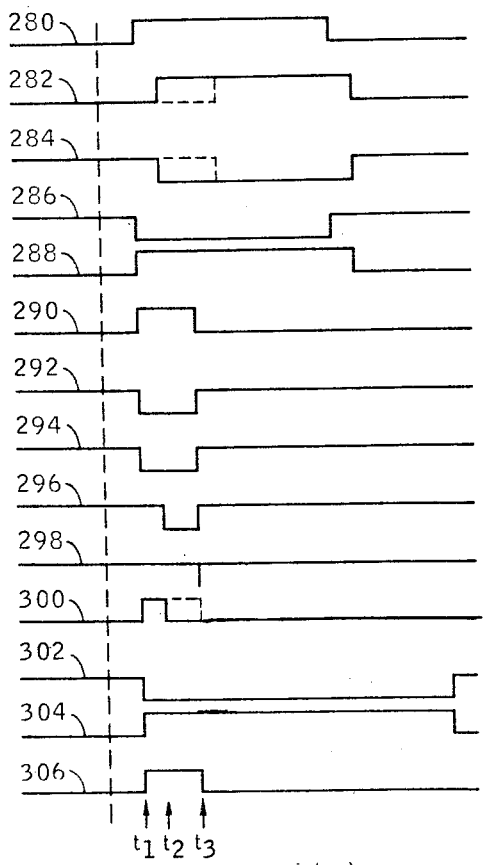
Figure 9C:
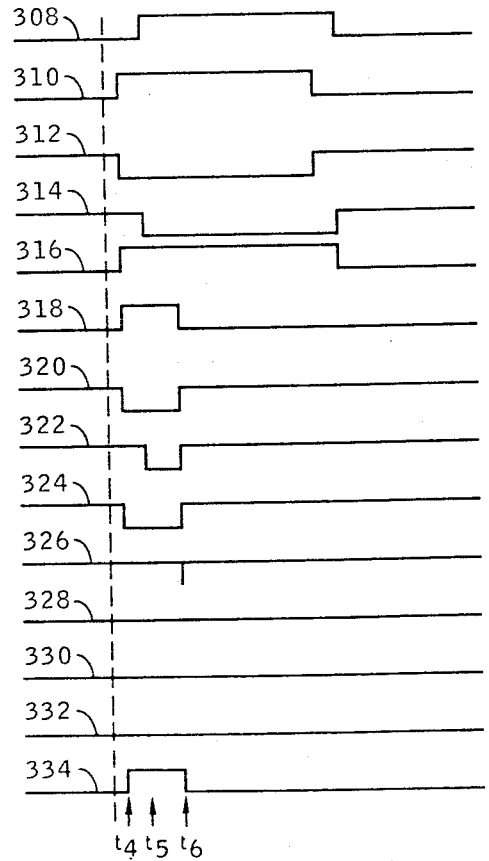

Operation of the over-all acoustic emission monitoring system is further illustrated in FIG. 9, which shows typical signal waveforms at various points as sensor signals are processed through the system. The horizontal time scale has been compressed in a somewhat logarithmic manner for clarity. The waveforms of FIG. 9 will be reviewed in conjunction with the schematic representation of the AEM in FIG. 3.

A typical signal as received at a first master sensor 10 is illustrated on line 250 of FIG. 9. In the case where the acoustic event occurred within the region adjacent the first master sensor 10, the signal will be received later at a second master sensor 10 as indicated at line 252. Similarly, the signal from the same event will arrive at the slave sensors 14 at different times, depending upon their relative distances from the acoustic signal origin.

The two master signals shown at 250 and 252 enter the mixer-amplifier 50 where the second signal is subtracted from the first, resulting in the approximate waveform illustrated at line 254. A high-pass filter section of mixer-amplifier 50 eliminates low frequency components from the signal, giving the approximate waveform shown at line 256. Meanwhile, signals from slave sensors 14 are being mixed and filtered in the same manner, resulting in a similar output signal.

The combined slave and combined master signals pass through wires 58 and 60, respectively, to two-phase comparator 54. The combined master signal enters terminal 140, as seen in FIG. 5, and immediately passes to two differential comparators made up of elements 160. Two signals are produced of opposite polarity, in pulsed form representing the signal at amplitudes exceeding a threshold represented by broken lines 258 in FIG. 9. Thus, the output of the differential comparator 160 is shown on lines 260 and 262 (FIG. 9). At element 162, which performs an OR function, the signals shown on lines 260 and 262 are first inverted, as shown on lines 264 and 266, then are reinverted and combined as represented on line 268. The signals from the slave sensors similarly pass from input terminal 142 of comparator 54, through a differential comparator circuit 160 and an OR circuit 162, to produce a signal (not shown) having a waveform similar to that shown on line 268.

The master and slave signals then pass through wires 64 and 66, respectively, to one-shot multivibrator group 68.

The master signal enters multivibrator group 68 at terminal 166, as seen in FIG. 6. This circuit includes four retriggerable monostable multivibrators which generate gates of desired lengths. At the first multivibrator 202, a 1.6 ms master gate signal is generated. As seen at line 270 (FIG. 9) this gate extends the signal until 1.6 ms after the end of the master signal shown on line 268. This signal passes to terminal 188, thence to terminal 198 and the 1$\mu$s multivibrator 202, where a 1$\mu$s master delay signal is generated as indicated at line 272. The 1$\mu$s master delay signal from terminal 192 then passes through line 72 to terminal 216 of logic circuit 80, as illustrated in FIG. 7, and to an RTS flip-flop 206. At the same time, the master gate signal from terminal 188 passes through line 70 to terminal 212 of logic circuit 80, and to the same RTS flip-flop 206. The resulting delayed master gate signal at line 283 is illustrated at line 274. The purpose of delaying the master gate signal by 1$\mu$s is to prevent electrical disturbances detected simultaneously by the master and the slave circuits from activating the logic circuit. Meanwhile, the slave signal entered at terminal 168, passed through the second 1.6 ms multivibrator 202 which generated a gate similar to that shown at line 270. The slave gate signal (not shown) thus appears at terminal 190.

The various signals are then transmitted to the rest of the logic circuit 80, which compares the master and slave signals to determine whether the original acoustic event occurred within the region near the master sensors. Two sets of waveforms are illustrated in FIG. 9 for the remainder of the AEM circuit; namely, master before slave and slave before master.

The case where a master sensor receives a signal before a slave sensor does is illustrated in the lower left hand series of waveforms in FIG. 9. The delayed master gate signal and slave gate signal are shown at 280 and 282, respectively. The delayed master gate signal passes from the first RTS flip-flop 206 through wires 283. The slave gate signal passes through wire 74 to terminal 214. The slave gate signal enters the logic circuit and passes to element 204 where, in the inverter 285, the signal is inverted, as shown on line 284. Similarly, the delayed master gate signal from element 206 passes to element 204 where, at inverter 287, the signal is inverted, as shown at line 286. The two signals are then compared in NAND gate 289, resulting in a signal as indicated at line 288. The output from NAND gate 289 passes to logic terminal 222, through wire 88 (FIG. 3) back to terminal 291 of multivibrator 68. Then, as seen in FIG. 6, the signal is passed through a 150 μs gate portion of element 202, producing a comparator pulse output at terminal 194 and a comparator gate output at terminal 196. This comparator gate signal is illustrated at line 290 and the comparator pulse signal is shown at line 292. These gate and pulse signals are then passed to logic circuit 80 through wires 76 and 78, respectively, where they enter at terminals 218 and 220, respectively. The comparator gate signal passes to NAND gate 293 of element 204 where it is compared with delayed master gate signal to produce the waveform shown at line 294. The comparator gate signal is also sent to NAND gate 295 of element 204, where the signal is compared with the slave gate signal, and produces the signal shown at 296. The actions of the second RTS flip-flop 206 and a NAND gate 297 are interrelated through a feedback loop. During the quiescent period before time $t_1$ of FIG. 9, the output of the combined elements at line 299 is at low state. At time $t_1$, the input to element 206 from element 293, waveform 294, goes to low state. This changes the output at 299 to high state. Later, at time $t_2$, when the input to element 206 from element 295, waveform 296, goes to low state, element 206 is reset, switching the output at 299 to low state as shown at line 300.

In case when the slave gate signal does not start within 150 μs after the delayed master gate signal, as shown by dotted lines of waveforms 282 andn 284, the trailing edge of the comparator pulse signal at time $t_3$ supplied to terminal 220 generates a momentary pulse at the output of NAND gate 297, as shown at line 298. This pulse resets the RTS flip-flop 206 to produce waveform as shown by dotted line at line 300.

The pulsed signal from element 206 then passes to monostable multivibrator 208, which generates a 10 ms negative-going count output pulse, as shown at line 302, at terminal 224. The count output pulse is then passed through wire 86 to terminals 230 and 232 of cable driver system 84. In the cable driver system, the count output pulse is passed through NAND gates 226 and MPS 2369 transistors 228, producing count output signal at terminals 238 and 90 with waveform of line 304, and count synchronization output of the same waveform at terminals 240 and 92.

Comparator pulse signal from monostable multivibrator group 68 is also passed through wire 78 to terminal 236 of cable driver system 84, where, through exactly the same circuitries as above, comparator synchronization output, waveform 306, is produced at terminals 242 and 92.

The case where a slave sensor receives a signal before a master sensor does is illustrated in the lower right hand series of waveforms in FIG. 9. The delayed master gate signal and slave gate signal are shown at 308 and 310, respectively. The generations of the inverted slave gate signal 312, the inverted delay master gate signal 314, the combined master-slave gate signal 316, the comparator gate signal 318, the comparator pulse signal 320, the delayed master/comparator gate NAND signal 322, and the slave/comparator gate NAND signal 324 are exactly the same as those of the previous case.

The actions of the following elements in the circuit, however, are different for this case. During the quiescent period before time $t_4$ of FIG. 9, the output of the combined elements, RTS flip-flop 206 and NAND gate 297, at line 299 is at low state. At time $t_4$, when the input to element 206 from element 295 (waveform 32x) goes to low state, element 206 is kept reset, i.e., the output of the element stays at low state. Later, at time $t_5$, when the input to element 206 from element 293 (waveform 322) goes to low state, this input cannot change the output state of element 206 because the reset input from element 295 is still kept low by waveform 324. Thus no output is produced from the combined elements, 206 and 295, as shown by waveform 328. The momentary reset pulse from NAND gate 297, waveform 326, has no effect because element 206 has never been set.

Since no pulse is produced at line 299, the monostable multivibrator 208 does not generate any pulse at terminal 224 as shown at line 330, and consequently no outputs are produced at output terminals 238 and 90 for count output signal signal and terminals 240 and 92 for count synchronization output.

Comparator synchronization output, waveform 334, is produced exactly the same way as in the previous case, as described above.

Thus, the system distinguishes between acoustic events originating near a master sensor, producing output signal wave 304, and acoustic events occurring near a slave sensor or outside the array, in that case producing no signals, symbolized by waveform 332.

Other variations, ramifications and applications of this invention will become apparent to those skilled in the art upon reading this disclosure. These are intended to be included within the scope of this invention as defined in the following claims.

I claim:

1. A system for monitoring structural failures and the growth of flaws in structures which compriss:
    a plurality of sensors positioned on a structure surface with at least one master sensor surrounded by a plurality of slave sensors;
    each master and slave sensor adapted to emit an electrical signal in response to a received acoustic pressure wave;
    acoustic emission monitoring means for receiving signals from said master and slave sensors and producing output signals corresponding only to acoustic pressure waves received by a master sensor before being received by any slave sensor.

2. The system according to claim 1 further including frequency filtering means for receiving signals from said master and slave sensors and passing on to said acoustic emission monitoring means only signals within a selected frequency range.

3. The system according to claim 1 further including signal counter means for receiving output signals from said acoustic emission monitoring means and counting and recording said output signals.

4. The system according to claim 1 further including oscilloscope means for receiving said output signals from said acoustic emission monitoring means and presenting visible waveforms conforming to said output signals.

5. The system according to claim 1 including mixer-amplifier means receiving signals from said master and slave sensors, to amplify and combine all slave sensor signals and all master sensor signals and produce a single combined slave signal and a single combined master signal.

6. The system according to claim 1 wherein said acoustic emission monitoring means includes a plurality of independent monostable multivibrators to generate pulses of selected durations from input pulses and logic means utilizing said pulses to separate signals first received at a master sensor from those first received at a slave sensor.

7. A method for monitoring structural failures in structures which comprises the steps of:
arranging a plurality of sensors on a structure surface with at least one master sensor surrounded by a plurality of slave sensors;
each sensor emitting electrical signals in response to received acoustic pressure waves;
monitoring signals from said master and slave sensors;
eliminating all signals which are received by any slave sensor before being received by a master sensor; and
generating output signals corresponding to signals received by a master sensor before being received by any slave sensor.

8. The method according to claim 7 further including the step of frequency filtering said signals from said sensors to monitor only signals within a selected frequency range.

9. The method according to claim 7 further including the step of counting and recording said output signals.

10. The method according to claim 7 further including the step of mixing and amplifying all of the signals from said slave sensors and all of the signals from said master sensors and producing a single combined slave signal and a single combined master signal for monitoring.

11. An acoustic emission monitor comprising:
signal receiving means to receive signals generated by sensors which emit electrical signals in response to received acoustic pressure waves; at least one signal originating at a master sensor and a plurality of signals originating at slave sensors surrounding said master sensor;
mixer-amplifier means receiving signals from said signal receiving means amplifying said signals and combining all master signals and all slave signals to produce a single master signal and a single slave signal;
two-phase comparator means receiving said master and slave signals separately from said mixer-amplifier means to detect both positive and negative deflections of incoming signals and to combine the detected signals;
monostable multivibrator means receiving signals from said two-phase comparator means to generate pulses of selected length from the input signals; and
logic means receiving signals from said monostable multivibrator means to determine the time relationship between input pulses and generate an output signal corresponding only to acoustic signals first received by a master sensor whereby said output signal corresponds to acoustic events occurring in the region surrounding said master sensors.

* * * * *